United States Patent
Ukai et al.

[15] 3,637,973
[45] Jan. 25, 1972

[54] ARC WELDING APPARATUS

[72] Inventors: Jun Ukai; Masaki Hiramatu, both of Nagoya, Japan

[73] Assignee: Mitsubishi Denki Kabushiki Kaisha, Tokyo, Japan

[22] Filed: Feb. 17, 1970

[21] Appl. No.: 12,094

[30] Foreign Application Priority Data

Feb. 19, 1969 Japan..................................44/12392

[52] U.S. Cl. .........................................219/131 R, 219/137
[51] Int. Cl................................................................B23k 9/10
[58] Field of Search...................................219/131, 135, 137

[56] References Cited

UNITED STATES PATENTS

| | | | |
|---|---|---|---|
| 2,969,494 | 1/1961 | Davis | 219/131 X |
| 3,051,828 | 8/1962 | Manz | 219/131 |
| 3,249,735 | 5/1966 | Needham | 219/131 |
| 3,423,564 | 1/1969 | Sevenco | 219/131 |
| 3,449,544 | 6/1969 | Needham | 219/131 |
| 3,459,920 | 8/1969 | Sevenco | 219/131 |
| 3,502,397 | 3/1970 | McCollister et al. | 219/131 X |

FOREIGN PATENTS OR APPLICATIONS

| | | | |
|---|---|---|---|
| 784,787 | 10/1957 | Great Britain | 219/131 X |

*Primary Examiner*—J. V. Truhe
*Assistant Examiner*—George A. Montanye
*Attorney*—Robert E. Burns and Emmanuel J. Lobato

[57] ABSTRACT

Upon initiating a welding operation, a relay is operated to connect two electric sources of alternating current in parallel circuit relationship through a contactor to fuse a welding electrode away from a workpiece striking an arc between them. Then another relay is operated to keep one of the sources disabled while the operation proceeds with the other source. Upon short circuiting, the contactor is operated to repeat the above process.

5 Claims, 3 Drawing Figures

PATENTED JAN 25 1972  3,637,973

ARC WELDING APPARATUS

BACKGROUND OF THE INVENTION

This invention relates to an arc-welding apparatus using a plurality of electric sources of the alternating current type for welding and including means for improving the establishment of an arc upon starting the arc and upon short circuiting a workpiece with the associated welding electrode in a welding operation.

In arc welding, a voltage across a welding electric source is first applied across a workpiece and the associated welding electrode through a welding cable and then the welding electrode is brought into light contact with the workpiece to strike an electric arc therebetween. The electric arc is caused from the fact that at the instant the welding electrode has been brought into contact with the workpiece a current supplied by the source fuses away the contacting portion thereof while at the same time the adjacent air is broken down and then a current begins to flow through the $\phi$ space between the electrode and the workpiece.

If an electric source used with the manual or automatic welding process has the drooping characteristic it can frequently fail to strike the above-mentioned arc. This results from the phenomenon that as long as a current flowing through the workpiece and welding electrode upon contacting them is below a magnitude required to fuse away the contacting portion thereof the electrode is fused on that surface portion of the workpiece contacting it without any arc striking therebetween. In that event no arc can strike before the particular short circuiting current generates heat in the associated resistance sufficient to fuse the welding electrode away from the workpiece. A time interval elapsing before an arc strikes depends upon the diameter of the welding electrode involved and the magnitude of a short circuiting current such that the less the short circuiting current with respect to the diameter of the electrode the longer the time interval will be. It may range from a few seconds to 10 seconds.

The phenomenon as above described can take place not only during the initiation of a welding operation, but also upon a workpiece being contacted by the associated welding electrode for some reasons during the particular welding operation.

Therefore where an arc welding operation is performed with an electric source having the drooping characteristic the prior art practice might fail to smoothly strike an electric arc leading to a great lot of time elapsing before an electric arc is established. Alternatively short circuiting might take place any time between the workpiece and the associated welding electrode during the welding operation to extinguish the arc. Thus the arc welding could be previously prevented from being smoothly performed and also much impeded from proceeding. Further with an arc-welding operation performed under these circumstances, the resulting welds are apt to become defective. This results in later adjustment which additionally decreases the workability.

In order to eliminate the above-mentioned disadvantages, attempts have been heretofore proposed that, upon contacting a workpiece with the associated welding electrode, a separate electric source is arranged to supply a high current sufficient to cooperate with the particular short circuiting current to instantaneously fuse the welding electrode away from the workpiece thereby to strike smoothly an electric arc while preventing any short circuiting during arc welding. These attempts have been disadvantageous in that, as the conventional arc-welding apparatus have the exclusive electric source added thereto or disposed therein, the installation of the separate source, or the new purchase of the exclusive source, is expensive.

SUMMARY OF THE INVENTION

Accordingly it is an object of the invention to provide a new and improved arc-welding apparatus simple and inexpensive in construction by which an electric arc is prevented from failing to strike while eliminating any short circuiting during welding at a high speed undetected by the operator, thereby preventing the occurrence of the disadvantages in interruption of the electric arc and resulting in great improvements in workability.

The invention accomplishes this object by the provision of an arc-welding apparatus comprising a first electric source of alternating current for supplying a welding current to both a welding electrode and a workpiece, a second electric source of alternating current capable of being connected in parallel circuit relationship to the first electric sources, switching means connected in the parallel circuit of the first and second electric source to open and close the parallel circuit, characterized by control means responsive to short circuiting of the welding electrode and workpiece to close the switching means and responsive to the occurrence of an electric arc across the welding electrode and workpiece to open the switching means.

In a preferred embodiment of the invention, the arc welding apparatus may comprise a first electric source of alternating current for supplying a welding current to both a welding electrode and a workpiece, a second electric source of alternating current capable of being connected in parallel circuit relationship to the first electric source, the first and second electric sources being substantially equal in drooping characteristics to each other, a switching means connected in the parallel circuit of the first and second electric sources to open and close the parallel circuit, and a control means including a first relay means energized in response to the no-load voltage across the first electric source, a second relay means deenergized during energization of the first relay means and energized in response to the occurrence of an electric arc across the welding electrode and the workpiece, and an electromagnetic element operative in response to energization of the second relay means closing the switching means in response to the occurrence of an electric arc across the welding electrode and workpiece.

BRIEF DESCRIPTION OF THE DRAWING

These and other objects features and advantages of the invention will become more readily apparent from the following detailed description in conjunction with the accompanying drawing in which.

DESCRIPTION OF THE PREFERRED EMBODIMENT

Figure 1:
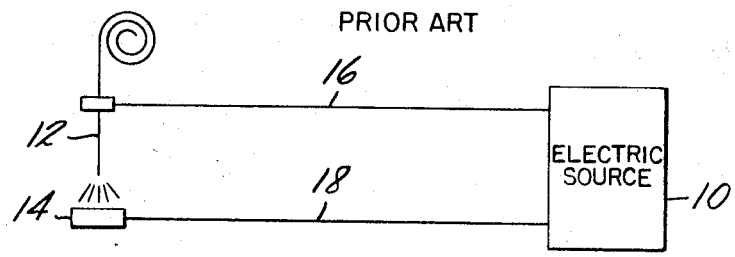
FIG. 1 is a schematic circuit diagram of an arc welding apparatus constructed in accordance with the principles of the prior art.
Figure 3:
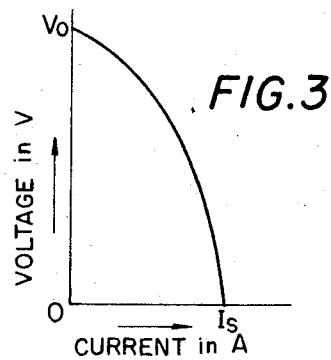
FIG. 3 is a graphic representation of the voltage-to-current characteristic of the electric source shown in FIG. 1 or 2.

Referring now to FIG. 1 of the drawing, it is seen that an arrangement disclosed herein comprises an electric source 10 of alternating current for supplying a welding current to a welding electrode 12 and a workpiece 14 through both a welding cable 16 connecting the source 10 to the electrode and a connecting cable 18 connecting the source 10 to the workpiece 14. As the welding electrode 12 is consumed during a welding operation the same is adapted to be successively fed from a supply roll toward the workpiece 14 in the well-known manner. With the source 10 having the drooping characteristic such as shown in FIG. 3, the apparatus has the disadvantages as previously described.

Figure 2:
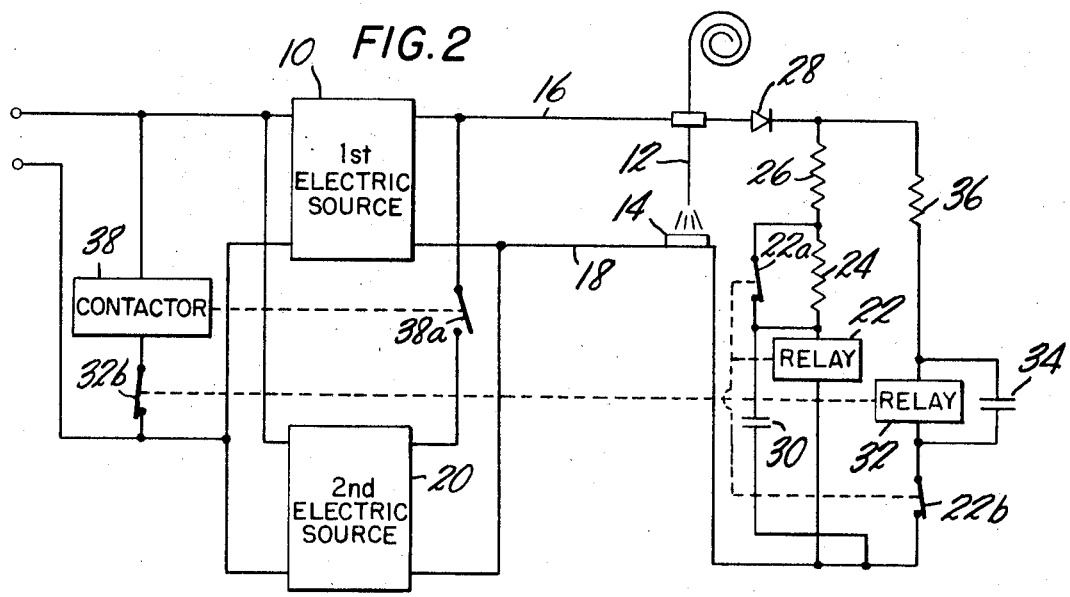
FIG. 2 is a schematic circuit diagram of an arc welding apparatus constructed in accordance with the principles of the invention.

The invention contemplates to eliminate those disadvantages and one embodiment thereof is illustrated in FIG. 2 wherein like reference numerals designate the components identical to those shown in FIG. 1. The arrangement illustrated comprises, in addition to the components 10 through 18 as shown in FIG. 1, a second electric source of alternating current 20 adapted to be connected across the first electric source 10 whenever it is necessary to do so as will be described hereinafter. Both the electric sources 10 and 20 have their inputs connected to a common power supply such as a commercial alternating current power supply (not shown). The first source 10 has the drooping characteristic as shown in FIG. 3 wherein the axis of ordinates represents a voltage V and the axis of abscissas represents a current I. Both the sources 10 and 20 are preferably in the form of transformers substantially identical in construction to each other. Therefore the second source 20 is substantially identical in drooping characteristic to the first source 10. Under these circumstances both the sources 10 and 20 are substantially synchronized with each other.

The workpiece 14 is connected to a winding of a direct current relay 22 which is, in turn, connected through a pair of serially connected resistors 24 and 26 to a rectifier or semiconductor diode 28 connected to the welding electrode 12. The relay 22 winding is connected across a smoothing capacitor 30 for smoothing a rectified voltage applied to the winding and the resistor 24 is shunted by a set of normally closed contacts 22a of the relay 22. The workpiece 14 is also connected to a winding of a second direct current relay 32 through another set of normally closed contacts 22b of the first relay 22. That winding is connected in parallel to a smoothing capacitor 34 identical in operation to the capacitor 30 and in series to a resistor 36 connected to the rectifier. The rectifier 28 serves to rectify a voltage across the welding electrode and workpiece 12 and 14 respectively to supply the rectified voltage to the windings of the relays 22 and 32.

The first relay 22 is responsive to the no-load voltage Vo (see FIG. 3) across the first sources 10 to be energized or picked up through the rectifier 28 and responsive to a welding voltage across the electrode and workpieces 12 and 14 respectively upon arcing thereacross to be deenergized or dropped out by virtue of the combination of resistors 24 and 26 and the contacts 22a.

The second relay 32 is responsive to dropping out of the relay 22 to be picked up with the welding voltage through the rectifier 28 and the resistor 36.

As shown in FIG. 2, an electromagnetic contractor 38 is connected across the inputs of both the sources 10 and 20 through a set of normally closed contacts 32b of the relay 32 and has a set of normally open contacts 38a disposed between the welding lead 16 and the output of the second source 20. The contactor 38 is responsive to dropping out of the second relay 32 to be energized to close its contacts 38a thereby to connect the second source 20 across the first source 10.

In the arrangement as shown in FIG. 2, the relay 22 is in its energized or picked up state by means of the no-load voltage Vo across the welding source 10 prior to the initiation of a welding operation. This causes the normally closed contacts 22b to be open thereby to maintain the relay 32 in its deenergized or dropped out state, but the contactor 38 is energized to close its normally open contacts 38a to connect the second source 20 across the first source 10.

Under these circumstances, the welding electrode 12 is brought into contact with the workpiece 14 whereupon the voltage applied across the relay 22 winding becomes null resulting in dropping out of that relay 22. Therefore the contacts 22b remain closed but the relay 32 is not energized because the voltage across the electrode and workpiece 12 and 14 respectively has a zero value. Thus the contacts 32b are maintained in their closed position to permit the contactor 38 to be energized to close its contacts 38a to connect both the sources 10 and 20 in parallel circuit relationship. As a result, the first source 10 cooperates with the second source 20 to simultaneously supply the welding electrode and workpieces 12 and 14 respectively currents sufficient to rapidly fuse away that interface at which the electrode is in contact with the workpiece thus leading to the occurrence of an arc therebetween.

Once the arc has struck, an arc voltage across the electrode and workpiece causes the relay 32 to be energized or picked up to open its contacts 32b. The opening of the contacts 32b causes the contactor 38 to be dropped out to open its contacts 38a. Therefore the second source 20 is disconnected from the first source 10 after which the welding operation proceeds only with the welding current provided by the first source 10.

During the welding operation the welding electrode 12 may short circuit the workpiece 14 for some reason or another. In this event, the voltage across the welding electrode and workpiece 12 and 14 becomes null while a short circuiting current such as a high current Ts shown in FIG. 3 flows through the welding electrode and the workpiece. This causes the relay 32 to be dropped out to permit its contacts 32b to close and the contactor 38 to be energized thus closing switch 38a to again place source 20 in circuit with source 10. Thereafter the process as above described in conjunction with the initiation of the welding operation is repeated until the welding electrode 12 is fused away from the workpiece followed by the disconnection of the second source 20 from the first source 10.

In the arrangement as shown in FIG. 2 whether it is in its unloaded state or in its welding mode is determined by picking up or dropping out of the relay 22 due to a change in voltage across the sources 10 or 20. However if the source includes means for preventing an electric shock, such a chance in voltage does not occur across the welding electrode and workpiece. In the latter event, a current flowing through the welding or connecting lead 16 or 18 respectively may be detected by any suitable means for operating the relay 22. Also, if a question should arise as to the useful life of various mechanical contacts operatively associated with the relays 22 and 32 and the contactor 38, then all, or some of them, may be replaced by thyristors, transistors, etc., to provide a contactless arrangement.

Further it will be understood that if any simple means such as a transfer switch is used to disable the arrangement of the invention that the sources can be independently operated in the conventional manner for the purpose of providing the respective welding currents.

We claim:

1. An arc-welding apparatus comprising, in combination, a welding electrode and a workpiece disposed in opposite relationship, a first electric source of alternating current supplying a welding current to both said welding electrode and said workpiece, a second electric source of alternating current connected in parallel circuit relationship with said first electric source, switching means disposed in said parallel circuit formed of said second electric source to open and close said parallel circuit, and control means responsive to short circuiting of said welding electrode and said workpiece to close said switching means to connect said second electric source in parallel relationship to said first electric source, including means responsive to the occurrence of an electric arc across said welding electrode and said workpiece to open said switching means to disconnect said second electric source from said parallel circuit.

2. An arc-welding apparatus as claimed in claim 1 wherein said control means includes a relay operative in response only to a welding voltage appearing across said welding electrode and said workpiece for generating an arc thereacross, and means responsive to the operation of said relay to open and close said switching means.

3. An arc-welding apparatus as claimed in claim 1 wherein said first and second sources have the drooping characteristics substantially identical to each other.

4. An arc-welding apparatus as claimed in claim 1 wherein said first and second sources have the drooping characteristics substantially identical to each other and wherein said control means includes a relay operative in response only to a welding voltage appearing across said welding electrode and said workpiece for generating an arc thereacross, and means responsive to the operation of said relay to open and close said switching means.

5. An arc-welding apparatus comprising, in combination, a welding electrode and a workpiece disposed in opposite relationship, a first electric source of alternating current supplying a welding current to both said welding electrode and said workpiece, a second electric source of alternating current connected in a parallel circuit relationship to said first electric source, switching means disposed in the parallel circuit of said second electric source to open and close said parallel circuit, and control means including first relay means energized in response to the no-load voltage across said first electric source, a second relay means deenergized in response to the energization of said first relay means but energized in response to a welding voltage appearing across said welding electrode and said workpiece upon occurrence of an electric arc thereacross, and an electromagnetic element responsive to the energization of said second relay means to open said switching means to disconnect said second electric source from said first electric source in said parallel circuit during generation of said electric arc, and said second relay means being deenergized in response to short circuiting between the electrode and workpiece for closing said switching means to connect said second electric source in said parallel circuit.

* * * * *